United States Patent [19]

Struntz

[11] Patent Number: 4,796,373
[45] Date of Patent: Jan. 10, 1989

[54] FISHING ROD WITH IMPROVED HANDGRIP

[76] Inventor: Bernard J. Struntz, 1002 Woodbridge St., St. Paul, Minn. 55117

[21] Appl. No.: 48,747
[22] Filed: May 11, 1987
[51] Int. Cl.⁴ ............................................. A01K 87/00
[52] U.S. Cl. ............................................. 43/23; 43/22
[58] Field of Search ...................... 43/23, 22, 18.1, 25, 43/20

[56] References Cited

U.S. PATENT DOCUMENTS

| | | | |
|---|---|---|---|
| 572,226 | 12/1896 | Spiegel | 43/25 |
| 2,600,259 | 6/1952 | Palmer | 43/23 X |
| 3,068,603 | 12/1962 | Zeigler | 43/22 |
| 3,171,227 | 3/1965 | Merrill | 43/20 |
| 3,484,979 | 12/1969 | Wonsch | 43/23 X |
| 3,744,173 | 7/1973 | Puyear | 43/22 X |
| 3,778,916 | 12/1973 | Wallace | 43/18.1 |
| 4,027,419 | 6/1977 | Popeil | 43/23 X |

FOREIGN PATENT DOCUMENTS 599667  6/1960  Canada ................................. 43/22

OTHER PUBLICATIONS

Popular Science, Sep. 1947, p. 186.

Primary Examiner—M. Jordan
Assistant Examiner—Carmine Cuda
Attorney, Agent, or Firm—Jacobson and Johnson

[57] ABSTRACT

The invention provides a fishing rod with an improved handle that is more secure and easy to hold comprising an elongated ring-shaped handle having an oblong opening adapted to receive at least three fingers and a finger opening ahead of the hand opening. An elongated forwardly projecting rod supporting element extends forwardly from the finger opening and includes a means for fastening a fishing reel to the handle.

2 Claims, 2 Drawing Sheets

FISHING ROD WITH IMPROVED HANDGRIP

FIELD OF THE INVENTION

The present invention relates to fishing equipment and more particularly to a fishing rod having an improved handle.

BACKGROUND OF THE INVENTION

A wide variety of fishing rods have been provided, most of which have an elongated cylindrical handle made of metal, plastic or cork. Some of these handles have in the past been at least partially contoured to fit the hand. Handles of this kind that are commercially available are generally somewhat uncomfortable to hold after a long period of time and do not provide a secure grip for the user or are difficult to manufacture. In view of the shortcomings of the prior art, the primary objective of the invention is to provide an improved fishing having a more secure handle that is easy for the user to hold, provides a secure grip and is well suited for low cost mass production.

These and other more detailed and specific objects of the invention will be apparent in view of the following specifications and drawings which illustrate the invention by way of example and not by way of limitation.

THE FIGURES

SUMMARY OF THE INVENTION

The present invention provides a fishing rod having an improved handle. The handle comprises a generally oblong, ring-shaped handgrip having an elongated, centrally located hand opening in which the user can place at least three fingers. The handgrip has an upper forwardly extending handgrip element above the hand opening, a lower forwardly extending hand enclosing element below the hand opening and a forwardly projecting rod supporting neck to which the fishing rod is secured. On the neck extension is provided a means for connecting a fishing reel to the handle.

Thus, the invention provides a handle having an elongated or oval ring-shaped body that includes an elongated central opening adapted preferably to receive three fingers during use and a forwardly extending elongated rod supporting neck to which the fishing rod and reel are connected. A conventional reel holding fastener can be provided on the neck portion to secure the reel in place. The handle thus has integral upper and lower elongated handle elements connected together at their forward and rearward ends. In a preferred form of the invention, a finger grip hole is provided at the forward intersection of the upper and lower handle elements. The finger hole is adapted to receive the index finger during use. If desired, the finger hole can be open at its forward end and, in that event, consists of a forwardly opening rearwardly projecting recess in the handle below the forwardly projecting rod supporting neck.

Figure 1:
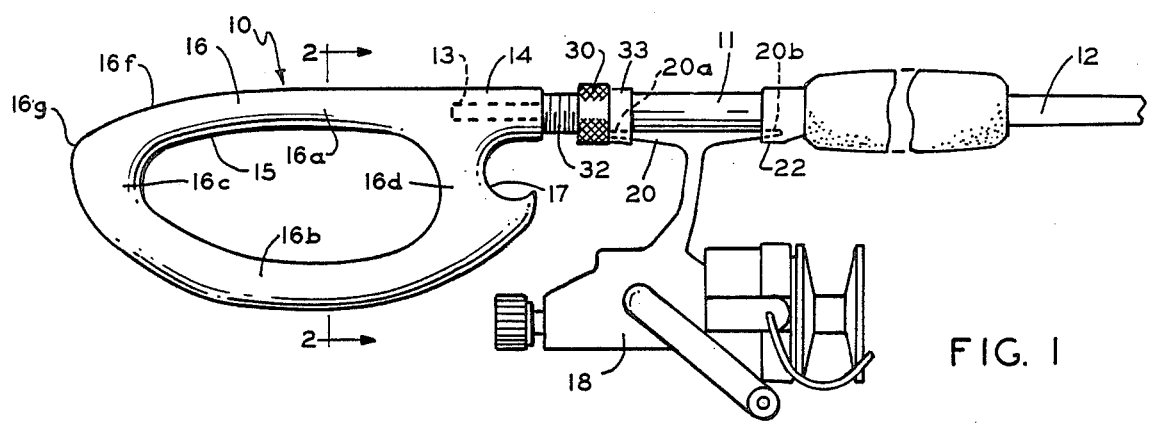
FIG. 1 is a side elevational view of an improved fishing rod and handle in accordance with the present invention.
Figure 2:
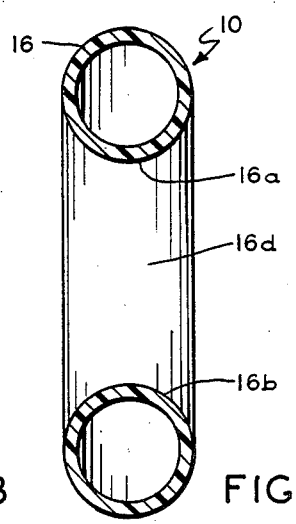
FIG. 2 is a vertical cross-sectional view taken on line 2—2 of FIG. 1.
Figure 6:
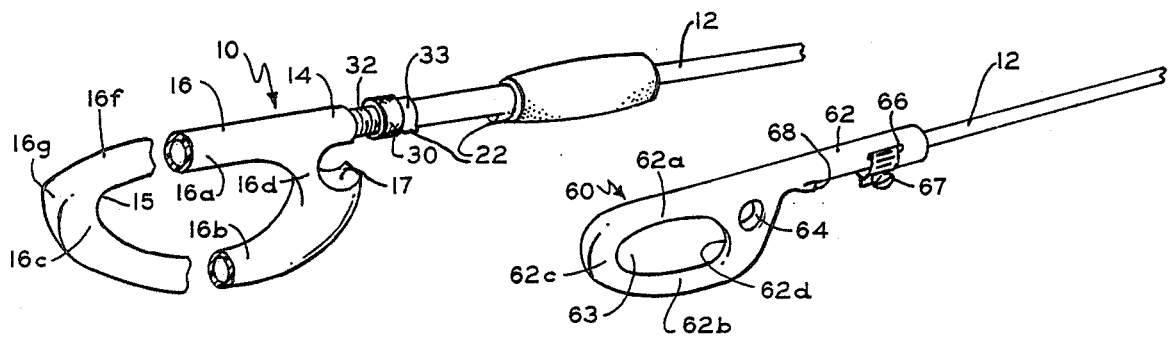
FIG. 6 is a perspective view of the rod and handle of FIG. 1.

Refer now to FIGS. 1, 2 and 6. Shown in the figures is a combination fishing rod and handle. The handle is indicated generally at 10 and a forwardly projecting neck at 11 is connected at its forward end to a fishing rod 12. The handle 10 includes a horizontally disposed forwardly extending generally cylindrical projection 14 having a rod receiving opening 13 at its forward end 14a in which the rearward end of the neck 11 is securely fastened. The handgrip portion of the handle indicated generally at 16 is elongated or oblong and includes integral upper and lower elongated handle elements 16a and 16b which as shown in FIG. 2 are both generally circular in cross-section. The handle elements 16a and 16b are of one piece intersecting at their rearward ends at 16c and at their forward ends at 16d providing a hand opening 15 to receive at least three fingers when the rod is in use. At the rear intersection of the upper and lower surfaces of the handgrip portion 16 of the handle can be provided a rearward projection 16g if desired to help the handle to fit the hand better and allow the user to exert downward pressure with the heel portion of the hand. The rear portion of the upper surface of the handle element 16a curves downwardly at its rear end 16f as shown.

At the intersection 16d at the forward end of the opening 15 is provided a finger hole 17. The finger hole 17 is open at its forward end allowing the finger to be free to move forwardly.

A suitable fastener is provided on the neck portion 11 to support a reel 18. For example, a portion of the neck 11 can be provided with threads 32 supporting a knurled nut 30. Connected to the knurled nut 30 is a sleeve 33 having a pocket 22 adapted to receive one end 20a of a reel mounting plate 20. The forward end 20b of the mounting plate 20 is supported in a rearwardly facing recess 22 in the neck 11. Thus when the knurled nut 30 is tightened the reel 18 will be held securely in place on the handle 10.

During use the palm of the hand is placed over the upper handle element 16a, the index finger is placed in the finger hole 17 and the three remaining fingers are placed in the elongated opening 15. It has been found that the handle is very comfortable to hold, provides a much more secure grip than a conventional handle, and is less tiring to hold over a long period of use. Moreover, if the line is suddenly pulled there is less chance for the rod to be pulled from the hand.

Refer now to FIG. 2 which illustrates a cross-section of the improved handle 10. The handle is formed from plastic resin and is hollow. A handle of this type can be formed, for example, by blow molding or slush molding. In this way a large handle can be provided without a large amount of plastic resin being required and the handle will have enough buoyancy to keep the rod afloat if lost overboard. However, if desired, any of the handles described can be solid rather than hollow.

Figure 4:
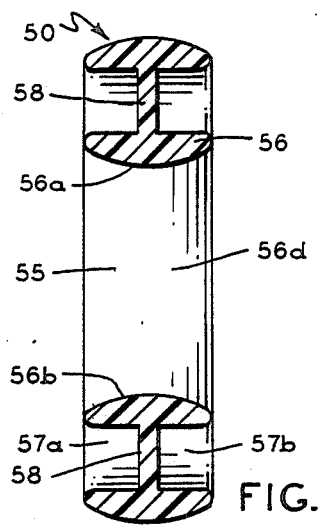
FIG. 4 is a view similar to FIG. 2 illustrating a modified form of the invention.

Refer now to FIG. 4 which illustrates a modified form of the invention in which the handle is injection molded through the use of injection molding dies that separate on either side of the molded piece when the piece is to be removed from the mold. The handle 50 has the same outline when seen from the side as shown in FIG. 1. It includes a handgrip 56 having upper and lower handle elements 56a and 56b similar to the handle elements 16a and 16b. Together elements 56a and 56b form the elongated ring-shaped handgrip 56. A hand opening 55 is provided similar to the hand opening 15 and the upper and lower elements 56a and 56b intersect at their forwards at an intersection 56d. The difference in this case is that the handle 50 is not hollow and is instead injection molded so as to have a generally "I" shaped cross-section with a central vertically extending web 58 defined between outwardly opening recesses 57a and 57b on either side thereof. In this way the handle 50 can be injection molded to have the same outline as shown in FIG. 1 with the requirement for a relatively small amount of resin by the provision of the recesses 57a and 57b on either side of the web 58. The embodiment of FIG. 4 though it can be readily formed by injection molding will not have the even surface contours and smooth feel of the handle described above.

Figure 5:
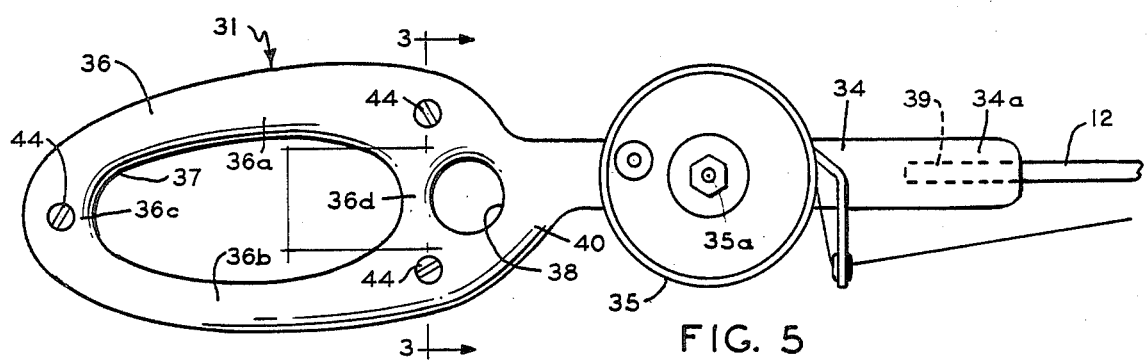
FIG. 5 is a side elevational view of another form of the invention.

Refer now to FIG. 5 which illustrates another form of the invention particularly suited for use in winter fishing. As shown in FIG. 5, the handle 31 includes a rear handgrip portion 36 and a forwardly projecting horizontally disposed neck 34 with an elongated recess or bore 39 at its forward end 34a to receive the rearward end of the rod 12. The neck 34 is integral with the handgrip portion 36 and is formed, e.g., by molding from plastic resins, at the same time.

As shown, the handgrip portion 36 is elongated and ring-shaped with an elongated central opening 37 that during use is adapted to receive three fingers of the hand. The elongated ring-shaped handle 36 includes an upper handle element 36a and a lower handle element 36b which intersect at their forward ends at 36d and at their rearward ends at 36e. Between the neck 34 and the intersection 36d is a finger hole 38. It can be seen that the forward end of the lower handle element 36b is bifurcated and includes a diagonal portion 40 in front of the finger opening 38 which is connected to the neck 34. The reel 35 is suitably mounted on the extension 34 as by means of a mounting spindle 35a which is secured to the neck 34.

Figure 3:
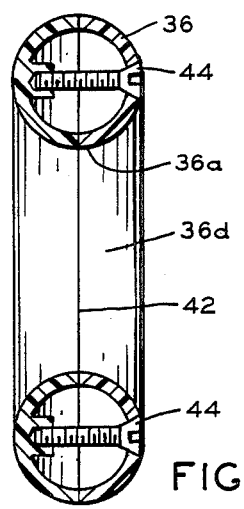
FIG. 3 is a vertical sectional view taken on line 3—3 of FIG. 5.

The handgrip 36 as shown in FIG. 3 is in this instance formed from two mating halves which meet along a vertically disposed centrally located separation line 42. The halves are fastened together during manufacture by means of screws 44. By this means a hollow handle can be provided thereby reducing the material required to form the handle and maintaining buoyancy.

Figure 7:
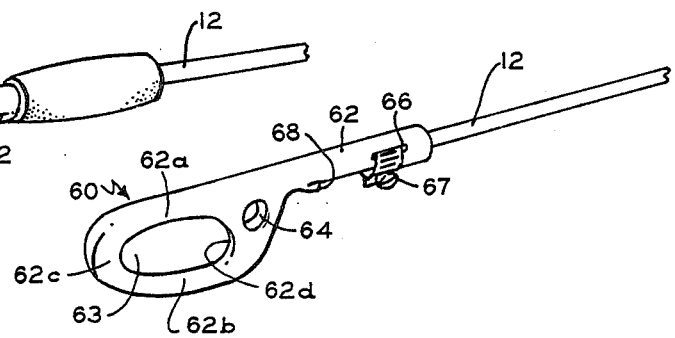
FIG. 7 is a perspective view of another form of the invention.

Refer now to FIG. 7 which shows a modified form of the invention generally similar to the embodiment of FIG. 5 but with a different means for supporting the reel 18. As shown in the figure, the handle 60 includes upper and lower elements 62a and 62b intersecting at 62c and 62d to define a hand opening 63 ahead of which is a finger hole 64. Extending forwardly from the finger hole 64 is a neck 62 having a transversely extending slot 66 adapted to receive a band-type clamp 67 in the nature of a hose clamp having a screw which when tightened will securely retain the reel 18 in place on the handle 60. A pocket 68 is provided to receive the rear portion of the mounting plate 20 which forms a portion of the reel 18. Thus, during use the rear end of the mounting plate 20 of the reel 18 is placed in the pocket 68 and the band fastener 67 is tightened by turning the screw until the reel 18 is securely fastened in place.

In this case the finger hole 64 of the handle 60 is closed at its forward end so that the finger must be withdrawn from the side. The combination of the openings 63 and 64 together with the upper handle element 62a which is downwardly curved at its rearward end provides a very secure handgrip allowing the user to easily and comfortably hold the rod for long periods of time so that even if there is a sudden pull on the rod by a particularly large fish there is little chance that the rod will be pulled from the hand.

Figure 8:
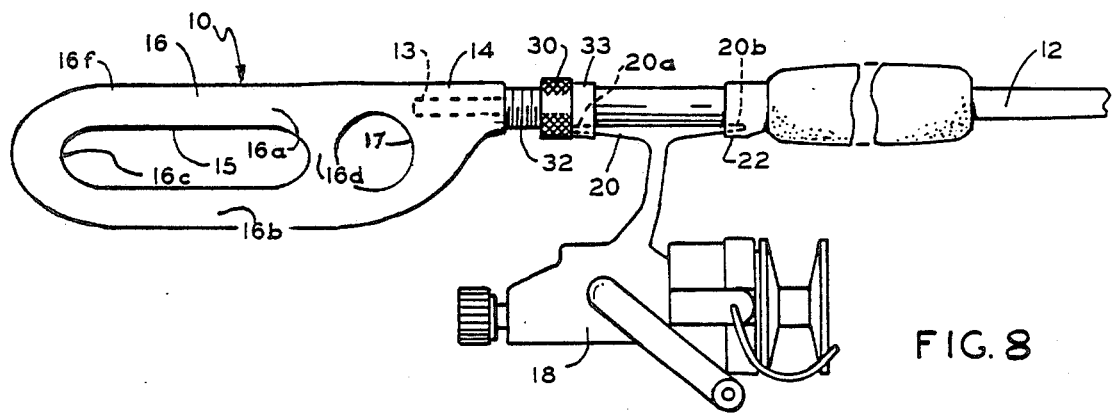
FIG. 8 is another form of handle in accordance with the invention.

Refer now to FIG. 8 wherein the same numbers refer to corresponding parts in FIG. 1. In this embodiment it will be seen that the finger opening 17 is entirely closed at its forward end. Thus, the finger must be removed by withdrawing it from the hole toward one side but it provides a very secure grip as well as comfort. The neck portion has a rearward cylindrical projection which is screwthreaded or dolled into the opening 13 of the handle projection 14. The reel 18 is held in place in the same manner as in FIG. 1 already described.

What is claimed is:

1. A fishing rod having an improved handle for use with a reel, mounted adjacent the handle, said handle being hollow to provide floatation, said handle formed from a pair of mating halves intersecting on a vertically disposed central parting line and fasteners secured between halves of said handle on either side of the parting line to secure said halves together, said handle including a horizontally disposed opening adapted to receive a strip fastener and said strip fastener is adapted to pass through said opening and to engage a portion of a fishing rod reel to secure the reel to said handle, said handle comprising an oblong handle grip having an elongated centrally located hand opening adapted to receive at least three fingers of the user during use, said handle grip formed by an upper and lower elongated forwardly and rearwardly oriented vertically spaced apart integral handle elements one of which is located above the hand opening and one of which is located below the hand opening, said handle element located below the opening forming an enclosure for the fingers of the user's hand, said handle element located above the opening forming a hand grip for the user to grasp in the palm of the hand by extending at least three fingers through said opening, said upper handle element and lower handle element having substantially similar size and shape, said handle elements intersecting and being integral with one another forwardly and rearwardly of the hand opening, said handle including a forwardly extending horizontally disposed rod supporting portion and a finger opening at the forward end of the handle grip portion adjacent the rear end of said forward extension, said finger opening located forward of said hand opening whereby said upper handle element can be held in the palm of the hand with fingers extending through said hand opening and the index finger placed in said finger opening to permit the user to control the action of said rod.

2. The handle of claim 1 wherein the central portion of the forwardly extending rod supporting projection is provided with means for connecting a fishing reel to the handle.

* * * * *